July 15, 1958 P. R. R. AIGRAIN 2,843,765

CIRCUIT ELEMENT HAVING A NEGATIVE RESISTANCE

Filed March 9, 1953

INVENTOR.
PIERRE ROGER RAOUL AIGRAIN
BY John M. Calimafde
ATTORNEY

United States Patent Office 2,843,765

Patented July 15, 1958

2,843,765

CIRCUIT ELEMENT HAVING A NEGATIVE RESISTANCE

Pierre Roger Raoul Aigrain, Paris, France, assignor to International Standard Electric Corporation, New York, N. Y., a corporation of Delaware Application March 9, 1953, Serial No. 341,290

Claims priority, application France March 10, 1952

3 Claims. (Cl. 307—88.5)

The present invention relates to circuit elements having a negative resistance capable of being used in circuits, such as oscillators, impulse regenerating circuits, or circuits having several stable states such as those used in counting circuits.

In connection with impulse technique, circuits are often used in which the characteristic curve, giving the intensity of current in function of the voltage applied, presents a region in which the slope is negative, while elsewhere the slope of the curve is positive. Such circuits, which comprise generally one or several vacuum tubes, or one or several transistors, are designated in a general way under the name of "negative resistance circuits."

One of the objects of the present invention is to provide a circuit element having a negative resistance utilizing the properties of the contacts between metal and semi-conductors.

Another object of the present invention is to provide an element with a semi-conductor-metal contact which may be used in negative resistance circuits and which may be manufactured with mechanical tolerances more easy to satisfy than those which are necessary for the manufacture of the transistors.

Before describing the device of the present invention and the circuits to which it is applied, the essential properties of the bodies known under the name of "semi-conductors," as well as the properties of the "semi-conductor-metal" contacts will be summarized rapidly.

A semi-conductor is a body in which the elements carrying electric charges capable of being displaced are in small number. This may result either from the fact that these charge carriers are normally absent at the absolute zero of temperature and appear only when the temperature rises, or from the fact that these charge carriers are only present as a result of the existence of impurity regions inside the semi-conductor body. An impurity region may be constituted either by an atom of chemical impurity, or more generally by regions of the semi-conductor, at the atomic scale, where there is to be found a discontinuity in the arrangement of the circuit which constitutes the crystalline network. If semi-conductor bodies are studied at a state of equilibrium, that is to say, when no current passes at any point of the semi-conductor, it is demonstrated that the two above mentioned phenomena exist simultaneously.

It is also necessary to distinguish two different types of elements carrying electric charges, namely: the free electron the properties of which are nearly the same as those of the electron in vacuum, and on the other hand, electric charge carriers known under the name of "positive holes," a positive hole being constituted by a region of the semi-conductor body where there is found a positive charge localised, corresponding to the absence of an electron at this point. This positive charge localised behaves as a free electron with a positive charge. At normal temperatures and for semi-conductor bodies which have a technical interest, it has been noted that the impurity regions existing in the semi-conductor body contribute to the formation either of free electrons or of positive holes, but never of both simultaneously. To these electric charge carriers of a type should be added charge carriers of both types in equal number which are produced by the direct excitation of the atoms of the semi-conductor. If one considers the particular case of germanium, which may be considered as a typical case, it may be stated that each impurity centre contributes to the formation of a free charge carrier. According to the type of impurity existing, there may be obtained an excess of free electrons or an excess of positive holes, and it may be said that the semi-conductor is either of the N type (negative) or of the P type (positive). If "$n$" is the number of electrons, "$p$" that of the holes, "$n_i$" that of the impurity centres, counted positively when counting centres N and negatively when counting centres P, the number of free carriers is given for the state of equilibrium by the two following equations:

$$n-p=N$$

$$np=2\frac{2mkT^3}{h^2}\cdot e^{-\frac{\epsilon i}{kT}}$$

in which $i$ is the specific activity energy of the semi-conductor of the order of 1 electron-volt, the other symbols having their usual meaning.

In the case of the germanium N which may be considered as typical: $\epsilon i=0,750$ e. v.; $N=10^{16}/\text{cm.}^3$;

$$n=10^{16}/\text{cm.}^3;\ p=3.10^{11}/\text{cm.}^3.$$

If there is used a contact between a metallic point and a piece of a semi-conductor body, such as germanium of the type N, there will be observed a rectifying effect, that is to say that the current passes only if the metallic point is brought to a positive potential with respect to the germanium. If the point is negative, only a very small current passes and this current, according to the theory and to the experience, is attributed for the most part to the fact that the positive holes only pass slowly when the point is negative whereas the electrons pass in greater quantities when the point is positive.

Shockley has demonstrated that it was impossible to increase considerably the number of free electrons existing in a semi-conductor body of the N type. If additional electrons are introduced at one point, they diffuse in all the mass of the semi-conductor body during a period of the order of $10^{-12}$ seconds and the equilibrium is instantaneously re-established. On the contrary, if positive holes are locally introduced, it will be found that these positive holes do not disappear instantaneously. However, the positive holes will recombine at length with the negative electrons and the equilibrium will be re-established; but a time of the order of a few micro-seconds is necessary for that, and this is sufficient for the positive holes to travel an appreciable distance.

On the other hand, Brattain has demonstrated that it was possible to inject positive holes in germanium of the N type by establishing a contact with a metallic electrode positively polarized, that is the say, in the direction in which the contact offers its lowest impedance. The direct current is then made in great part not of free electrons but of electrons normally bound in the semi-conductor and which leave the semi-conductor whilst leaving behind them positive holes. If in the vicinity of a first electrode, thus polarized positively, there is placed a second polarized electrode in the direction of the high resistance (negative), the positive holes produced by the first electrode are attracted by the second electrode and come to increase the current traversing it. Such a device is designated under the name of "transistor" and it is capable of being used in amplifiers in view of the difference of impedance ($dv/di$) of the two point contacts. The foregoing considerations have been exposed with reference to germanium of the N type, but it is also possible to obtain analogous results with other semi-conductor bodies, such as silicium, or lead sulphide, or germanium of the P type.

There exists also in devices of the transistor type an effect known under the name of "current gain" the theoretical explanation of which is less clear, but the experimental existence of which is certain. According to the previous theory, the increase of the current traversing the second electrode could not be greater than the current traversing the first. In fact, an increase of the current traversing the second electrode is often observed to be from twice to three times greater than the current which traverses the first. There have been certain transistors for which this ratio reaches the number 26.

According to one of the features of the invention a circuit element the curve of which, giving the characteristic of the current in function of the voltage, shows a negative characteristic, comprises in combination, a semi-conductor-metal contact, a source of alternating current, a source of direct current, the two current sources and the semi-conductor-metal contact being connected in series, the peak amplitude of the said alternating current being greater than the difference of potential at the terminals of the direct current source, and the frequency of the said alternating current being such that the irregular carriers of electric charge injected at a point of the cycle do not disappear completely during one period.

According to another feature of the invention in such devices the direct current source is connected in order to polarize the semi-conductor-metal contact in the direction of the highest impedance.

According to another feature of the invention in such devices the alternating current source is constituted by the secondary winding of a transformer the primary winding of which is connected to the terminals of a high frequency current generator.

According to another feature of the invention, a circuit with two stable states, so-called flip-flop circuit, comprises in combination, a negative resistance circuit element, such as described above, and a charge resistance connected in series with the said negative resistance element.

The objects, features and advantages of the present invention will appear at the reading of the following description of embodiments, the said description being made in conjunction with the annexed drawings in which.

Figure 1:
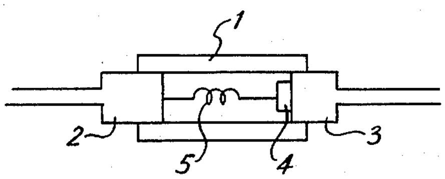
Fig. 1 represents a semi-conductor-metal contact circuit element used for embodying the present invention.

Referring to Fig. 1, there is shown in 1 an insulating sleeve, having for example a cylindrical shape, and in 2 and 3 two metallic pieces which are fixed to the two extremities of the insulating sleeve 1. A germanium pellet 4, for example of the N-type, is soldered to the metallic piece 3, and a catwhisker 5, constituted by a metallic wire, for example of Phosphor bronze, is soldered to the metallic piece 2. The metallic point of the catwhisker 5 is in contact with the surface of the germanium pellet 4, the whole constituting a device analogous, on the outside, to a germanium diode. However, such a semi-conductor-metal contact device must be constituted, as is well known in the art, by the momentary application of a reverse over-voltage. Semi-conductor bodies may be used for constituting the pellet 4 in which the life duration of the injected irregular electric charge carriers is too low for use in manufacturing transistors, unless impractical mechanical tolerances are required for the spacing of the points.

In the following of the description, the element shown in Fig. 1 will be represented schematically as an asymmetrical conductive element, as is known in the art, this element being surrounded with a circle.

Figure 2:
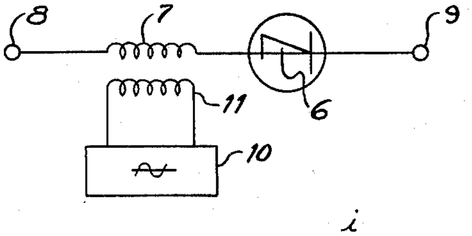
Fig. 2 represents a circuit using the device shown in Fig. 1.

Referring to Fig. 2, it will be seen that a semi-conductor-metal contact device 6, analogous to that shown in Fig. 1, is connected in series with the secondary winding 7 of a transformer between the terminals 8 and 9. A high frequency alternating voltage is applied by the generator 10 to the primary winding 11 of the transformer, so that the alternating voltage which appears at the terminals of the secondary winding 7 is applied in series with the semi-conductor-metal element 6.

Figures 3, 4:
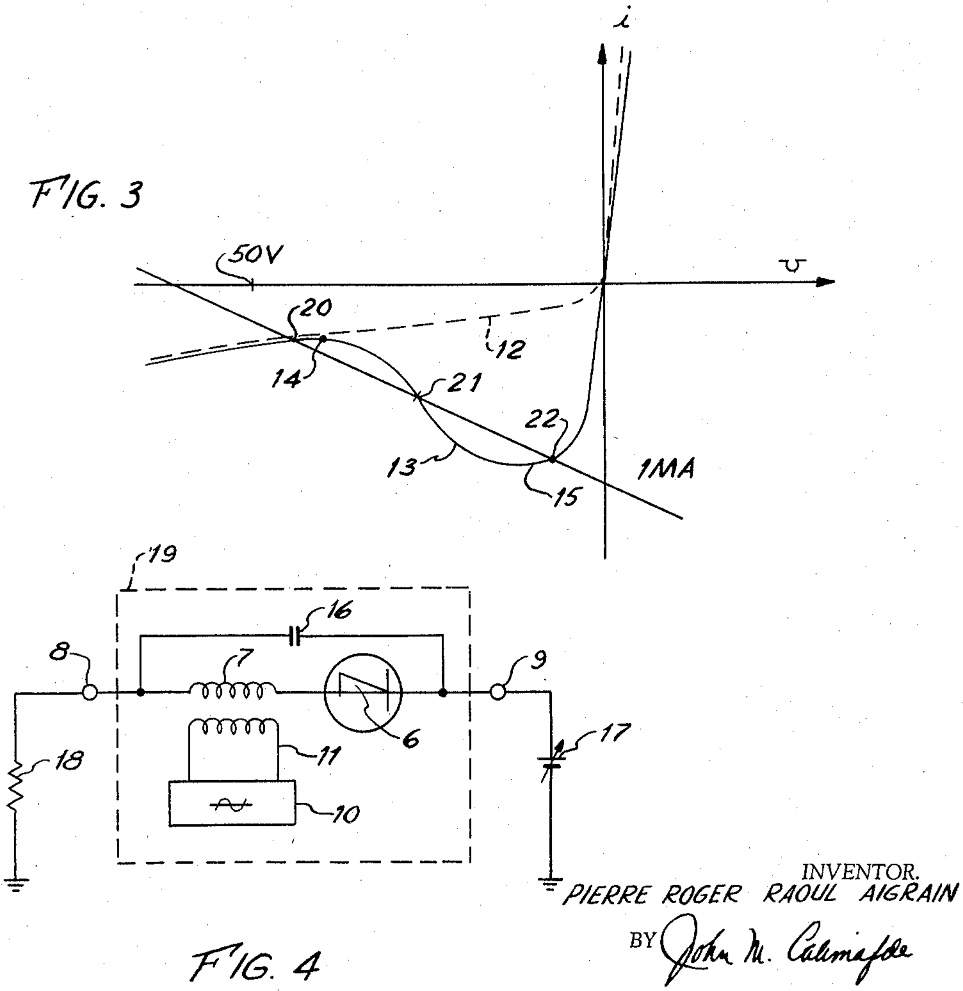
Fig. 3 represents a characteristic curve of the circuit shown in Fig. 2.
Fig. 4 represents a flip-flop circuit having two stable conditions embodying features of the present invention.

There is shown in Fig. 3, at 12, the curve giving the characteristic of the current in function of the voltage in the case in which the high frequency alternating voltage is nil; this characteristic is considered for a low frequency alternating current so that it is possible to neglect the impedance of the transformer. If a high frequency alternating voltage is applied to the primary winding of the transformer, it will be seen that, if the frequency is sufficiently high for the regular carriers injected in the semi-conductor at a point of the cycle not to disappear completely during one period, the curve 12 becomes deformed and the characteristic of the current in function of the voltage is obtained and represented in full line, in 13 in Fig. 3. It may be seen that this curve offers a negative slope between the points 14 and 15. This phenomenon may be explained as follows: if the voltage applied in the reverse direction is greater than the alternating peak voltage, the rectifier element 6 is constantly polarized in the direction of its highest resistance and practically no direct current passes in the element 6 and the features of this element are very slightly modified by the application of the high frequency alternating voltage. If the high frequency alternating voltage is higher than the voltage applied, direct current passes during part of the period of this current and this direct current is, as has been already mentioned, constituted in great part by abnormal electric charge carriers. The latter cannot go beyond the catwhisker 5 (Fig. 1) during the very short time of the current passage. However, during the greatest part of the period, the voltage is applied in the reverse direction and the abnormal electric charge carriers are then attracted and collected by the point; as this has been already mentioned, this causes the passage in the outside circuit of more than one electric charge for each abnormal carrier collected. If the gain of current is sufficiently high and if the frequency of the high frequency alternating current applied is such that the recombination of the abnormal electric charge carriers may be neglected during the duration of a high frequency cycle, a substantial increase of the direct current which traverses the element in the direction in which it offers its highest resistance results therefrom. This is shown by the part 14—15 of the characteristic curve 13 (Fig. 3).

The applicant has experimentally noted that it was easy to find elements for which the maximum negative slope of the current characteristic in function of the voltage is higher than one milliampere per volt. If the semi-conductor used is germanium, one may use a generator 10 giving an alternating current the frequency of which is of the order of 2 to 3 megacycles per second. However higher frequencies may be used which may be advantageous from the point of view of the associated circuits. In fact if the frequency is not sufficiently high, it is necessary to connect in parallel capacity elements.

It may be noted that the external features of the element described and shown in Figure 3 are not very different from the features of a transistor with current gain measured between the base electrode and the transmitting electrode and with a source of direct voltage connected between the transmitting electrode and the collecting device in the suitable direction. However the element described possesses the advantage of using a single point or finder, and, as the base electrode 4 (Fig. 1), some semi-conductors may be used in which the life of the abnormal electric charge carriers which are injected is too low to make possible their use for manufacturing transistors, provided an alternating current of sufficiently high frequency is used.

There is shown in Figure 4 a circuit with two stable conditions, which circuit uses the circuit element shown in Figure 2. In this figure, the elements fulfilling the same function as the elements of Figure 2 have been designated by the same references. The condenser 16 has been connected in order to give a low resistance circuit for the high frequency current. A potential source 17 is connected between the terminal 9 and ground and a resistance 18 is connected between the terminal 8 and ground. The corresponding slope line has been shown at 1mA in Fig. 3; it may be seen that it cuts the characteristic curve 13 of the circuit element, shown inside a dotted line frame 19 at three points 20, 21 and 22. The points 20 and 22 correspond to stable equilibrium positions, whereas the point 21 corresponds to an unstable equilibrium position. If it is assumed that the element is in the stable position corresponding to a relatively intensive current, for example the point 22, a momentary increase of the direct voltage applied in series from the source of potential 17, causes the circuit to pass to the stable equilibrium position 20, corresponding to the lowest current. A negative impulse having a suitable amplitude then causes the circuit to pass to the stable equilibrium position 22.

Such circuits having two equilibrium conditions or positions may be applied to counting circuits or to registering circuits.

While the principles of the invention have been described above in connection with specific embodiments and particular modifications thereof, it is to be clearly understood that this description is made only by way of example and not as a limitation on the scope of the invention.

What is claimed is:

1. An electric circuit having two conditions of equilibrium comprising a semi-conductor-metal contact, a source of direct current connected to said contact, a source of high frequency alternating current, circuit means for connecting said alternating current source in series with said direct current source, the frequency of said alternating current being sufficiently high so that the charge carriers injected in the semi-conductor at a point of the cycle do not disappear completely during one period of the cycle and the characteristic current-voltage curve of the semi-conductor-metal contact will have a portion with a negative slope, and means for varying the potential of said direct current source between those predetermined values which will cause said semi-conductor-metal contact to operate at one or the other end of said negative slope.

2. An electric circuit, according to claim 1, further comprising a condenser connected across said contact and said circuit means for bypassing the alternating current.

3. An electric circuit, according to claim 2, in which the semi-conductor-metal contact is a germanium diode.

References Cited in the file of this patent

UNITED STATES PATENTS

| | | |
|---|---|---|
| 2,418,516 | Lidow | Apr. 8, 1947 |
| 2,627,575 | Meacham et al. | Feb. 3, 1953 |
| 2,647,995 | Dickinson | Aug. 4, 1953 |
| 2,651,728 | Wood | Sept. 8, 1953 |
| 2,666,816 | Hunter | Jan. 19, 1954 |

OTHER REFERENCES

National Bureau of Standards—Technical News Bulletin, vol. 38, October 1954, No. 10, pp. 145 to 148, Diode Amplifier.